United States Patent [19]

Lagunilla

[11] 4,014,315
[45] Mar. 29, 1977

[54] COVER FOR COOKING KETTLES

[76] Inventor: Carlos Lagunilla, Francisco del Paso y Troncoso No. 324B6 Unidad Kennedy, Mexico 9, D. F., Mexico

[22] Filed: Nov. 3, 1975

[21] Appl. No.: 628,254

[30] Foreign Application Priority Data

Nov. 18, 1974 Mexico .............................. 155020

[52] U.S. Cl. ........................... 126/275 R; 126/9 R; 220/8
[51] Int. Cl.² ......................................... F24C 1/16
[58] Field of Search ............... 126/275 R, 9 R, 29; 220/4 A, 8, 9 R; 137/370; 73/429; 285/302

[56] References Cited

UNITED STATES PATENTS

| | | | |
|---|---|---|---|
| 1,271,309 | 7/1918 | Gross | 126/275 R |
| 2,287,312 | 6/1942 | Kader | 126/275 R X |
| 2,736,384 | 2/1956 | Potts | 285/302 X |
| 2,798,476 | 7/1957 | Marion, Jr. | 126/275 R X |
| 2,827,004 | 3/1958 | Luce et al. | 220/8 X |
| 3,153,252 | 10/1964 | Ricciardi | 285/302 X |
| 3,372,830 | 3/1968 | Edwards | 220/9 R |

*Primary Examiner*—William E. Wayner
*Assistant Examiner*—William E. Tapolcai, Jr.
*Attorney, Agent, or Firm*—Ladas, Parry, Von Gehr, Goldsmith & Deschamps

[57] ABSTRACT

A hood type double-walled telescopeable cover for cooking kettles, formed by a series of interengageable hollow elements, wherein the top element is bell-shaped and has an opening at its upper center portion and at its lower edge it has horizontal slots in the form of an inverted L; the remaining elements being in the form of the frustum of a cone having at their upper edges protruding pins that engage into the L shaped slots of the correspondingly upper element to form a bayonet coupling while at the bottom edges they have similar slots also in said inverted L shape where the pins of the upper edges of the correspondingly lower element engages; another series of similarly shaped elements but of lesser diameter constructed in such a manner that the whole unit is capable of being disassembled so that the whole series of outer most elements slidingly fit into the upper element immediately above and the inner elements are similarly capable of being disassembled to be slidably fit inside the correspondent upper element in order to form a compact unit construction whose height is only that of the upper most bell-shaped element that houses the remaining series of elements.

3 Claims, 3 Drawing Figures

COVER FOR COOKING KETTLES

BACKGROUND OF THE INVENTION

This invention relates to cover for cooking ovens or kettles of the bell-shape type. More particularly this invention is an improvement over the bell-shaped cover or chamber of my pending application U.S. Ser. No. 526,341 filed on Nov. 22, 1974, now abandoned; the improvement consists in that the cover mentioned in my earlier application is of a single unit. Such type of cover construction offers difficulties in that it only provides a single cooking chamber above the grill. In addition, such type of cover is a bulky unit that cannot be easily stored. On the contrary, my improved cover is composed of several interengageable units that when assembled form a telescopeable double-walled cover and when disassembled it is a pliable unit that can be easily stored occupying the minimum space. Another advantage of my improved cover is that when fully assembled it offers sufficient space so that it can cover big pieces that are desired to be cooked such as it would be the case for turkeys.

It should be realized that my cover is also an improvement over the prior art covers of kettles such as those described in U.S. Pat. No. 3,538,906; the cover described in the SNR KETTLE marketed by the Charm Glow Product Co., or of the one unit cover of the kettle sold by the KING-SEELY THERMOS CO. kettle grill model 7873-50, of Freeport, Ill.

DETAILED DESCRIPTION OF THE INVENTION

Figure 1:
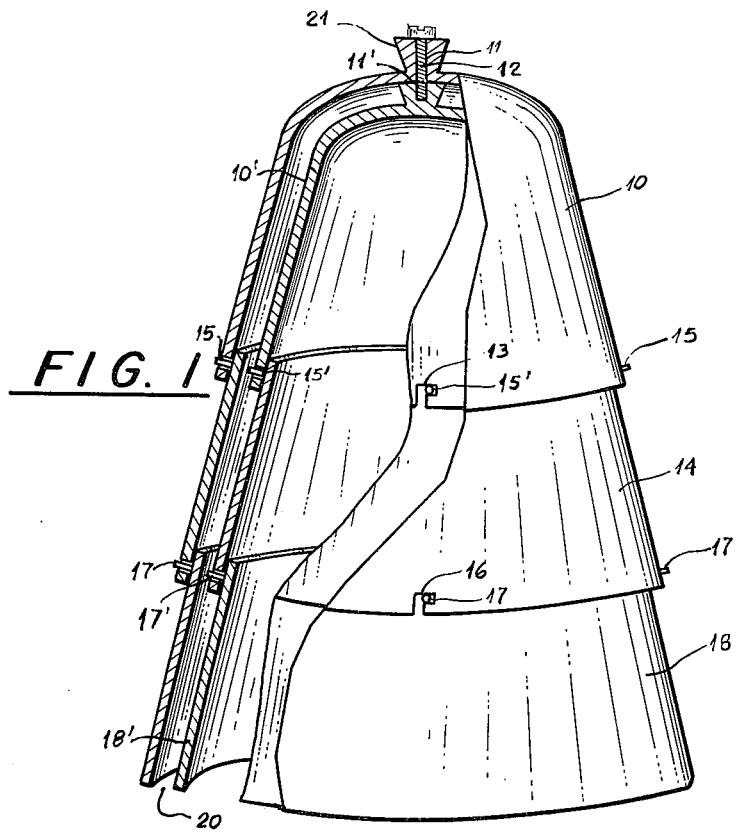
FIG. 1, is a perspective view with a conventional section showing the improved cover of the invention in its telescoped position.
Figure 2:
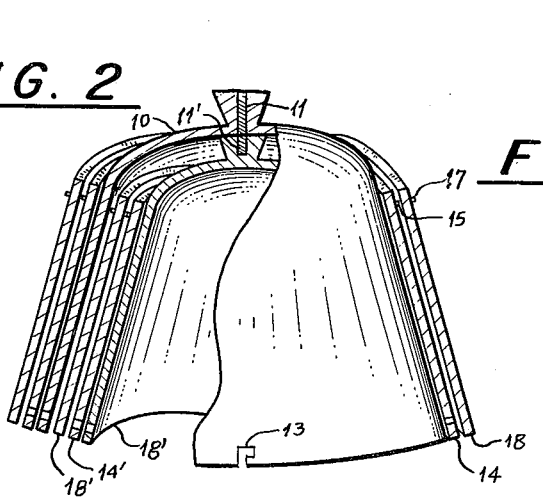
FIG. 2, is a perspective view showing a conventional section of the improved cover of the invention in its compacted position.

Referring to the drawings, particularly FIGS. 1 and 2, we have a cover for a cooking kettle; there is illustrated a top upper bell-shaped hollow and concave element 10 with a top perforation 11 in a top protrusion 21 through which the fixing means screw 12 may be inserted. This element 10 has at its lower edge a multiplicity of opening slots in the form of an inverted L. Then, a second hollow element 14 having a frustum of a cone shape and which has at its upper edge pins 15 slidingly coupled to the slot opening of inverted L shape of element 10 thus forming a bayonet coupling. This element 14 also has at its lower edge, slot openings in inverted L shape to which the pins 17 of other lowest element 18 engages in the form of bayonet coupling, which element 18 is also a hollow frustum of a cone shaped element.

Figure 3:
FIG. 3, illustrates an elevational view of the holding element in the form of a screw and bolt combination.

Underneath, the just described series of elements 10, 14 and 18 is another respectively similar series of inner elements 10', 14' and 18' that are also assembled by means of bayonet couplings which are possible by the use of combination of similar pins and inverted L shaped opening slots. These series of elements 10', 14' and 18' are held firmly to the cover unit formed in its outside by elements 10, 14 and 18 by means of holding means screw 12 of FIG. 3 that penetrates into hole 11' of the upper element 10' of this inner unit cover. Thus, as it is illustrated in FIG. 1, when the whole cover is assembled it is actually a double-walled cover having between the outer wall formed by elements 10, 14 and 18 and the inner wall formed by elements 10', 14' and 18' there is isolating heat chamber constituted by space 20 which can be easily observed in FIG. 1. When holding means 12 is unscrewed the whole unit may be disassembled as shown in FIG. 2 wherein after disengaging the pins 15 & 17 as well as pins, 15' and 17' from the corresponding inverted L shaped slot openings, the whole combination of elements are compacted into an easily storable unit that can in turn be firmly held by the holding means 12 and nut 19 that can be screwed into perforation 11 and 11'.

I claim:

1. A double-walled telescopeable and demountable cover for cooking ovens having inner and outer walls parallely spaced forming a thermal insulating chamber therebetween, each of said walls being formed by a plurality of partially overlapping frustoconical elements, said overlapping elements having the outside diameter of the uppermost portion of one element slightly less than the inside diameter of the lowermost portion of the adjacent overlaying element, said adjacent frustoconical elements being overlapped at their ends and engaged by a bayonet coupling, said walls having a bell-shaped uppermost section with an external central protrusion having a central threaded bore, said protrusion on each of said bell-shaped sections being coupled in a superimposed manner by fixing means.

2. A double-wall telescopeable and demountable cover according to claim 1, wherein said bayonet coupling includes a pin located at the outer upper portion of each of said sections which engages opening slots of an inverted L shape located at the lower portion of said adjacent overlapping sections.

3. A double-wall telescopeable and demountable cover according to claim 1, wherein by removing said fixing means it is possible to fold said walls in such a manner that some of said frustoconical elements are disposed between said two bell-shaped elements and the remaining frustoconical elements are disposed outwardly of said bell-shaped elements to form a compact unit.

* * * * *